United States Patent [19]

Bodmann

[11] 4,227,968

[45] Oct. 14, 1980

[54] PRESSURE VESSEL ASSEMBLY FOR HIGH-TEMPERATURE NUCLEAR REACTOR

[75] Inventor: Erik Bodmann, Mannheim, Fed. Rep. of Germany

[73] Assignee: Siempelkamp Giesserei GmbH, Krefeld, Fed. Rep. of Germany

[21] Appl. No.: 1,391

[22] Filed: Jan. 5, 1979

[30] Foreign Application Priority Data

Jan. 7, 1978 [DE] Fed. Rep. of Germany ....... 2800644

[51] Int. Cl.² .............................................. G21C 5/00
[52] U.S. Cl. ...................................... 176/87; 176/84; 176/DIG. 2
[58] Field of Search ............... 176/84, 85, 87, DIG. 2; 220/3

[56] References Cited

U.S. PATENT DOCUMENTS

| | | | |
|---|---|---|---|
| 2,942,115 | 6/1960 | O'Connell | 176/DIG. 2 |
| 3,523,063 | 8/1970 | Zerna | 176/87 |
| 3,933,182 | 1/1976 | Costes | 176/87 X |
| 3,963,936 | 6/1976 | Lovve | 176/DIG. 2 |
| 4,004,971 | 1/1977 | Freck et al. | 176/84 X |
| 4,038,136 | 7/1977 | Gallet et al. | 176/87 |
| 4,047,632 | 9/1977 | Schilling | 176/87 X |

FOREIGN PATENT DOCUMENTS 1684594 3/1971 Fed. Rep. of Germany.
2326907 10/1975 Fed. Rep. of Germany.
2532895 2/1977 Fed. Rep. of Germany.

*Primary Examiner*—Peter A. Nelson
*Attorney, Agent, or Firm*—Karl F. Ross

[57] ABSTRACT

A nuclear-reactor assembly comprising a pressure vessel for the nuclear reactor and auxiliary vessels disposed in annularly spaced relationship around the reactor pressure vessel and communicating therewith by horizontal passages in the walls between the vessels. According to the invention, the outer surface of the reactor pressure vessel, which is otherwise generally cylindrical, is formed with vertical surfaces in the region of the passages against which complementary vertical planar surfaces of the auxiliary vessels lie. The spaces between the auxiliary vessels are filled in the plane of these passages by support blocks so that the blocks together with the auxiliary vessels form a compound disk which is prestressed inwardly by a peripheral prestressing element passing around the perimeter of the disk.

8 Claims, 5 Drawing Figures

4,227,968

PRESSURE VESSEL ASSEMBLY FOR HIGH-TEMPERATURE NUCLEAR REACTOR

FIELD OF THE INVENTION

The present invention relates to a nuclear-reactor assembly and, more particularly, to an assembly which consists of a pressure vessel containing the nuclear reactor and additional vessels arrayed around the reactor vessel for components of the system, for example heat exchangers, which communicate with the central or reactor vessel by horizontal passages which can lie in a common horizontal plane.

BACKGROUND OF THE INVENTION

It is known to provide prestressed pressure vessels of cast material, e.g. cast iron or steel, as pressure vessels for nuclear-reactor installations and particularly for housing the high-temperature reactor core.

In such systems it is also a common practice to provide a number of heat-exchange components and horizontal gas passages which communicate between the heat exchangers and the reactor vessel for connecting the high-temperature reactor with the primary coolant flow.

In such systems, the pressure vessel for the high-temperature reactor can be centrally located and the centrally disposed reactor vessel can be surround by a plurality of pressure vessels each containing heat-exchanger or other components. These auxiliary vessels may also be provided as separate prestressed pressure vessels of cast material. The component vessels can be disposed in a partial circle around the central or reactor vessel, i.e. can be annularly spaced therearound.

Prior to the development of such systems, efforts in this field concentrated upon the provision of a completely integrated reactor assembly in which the high-temperature reactor and the primary coolant components, such as tube furnaces or steam generators (more generally referred to as heat exchangers) were provided in a common prestressed concrete pressure vessel.

When, however, attempts are made to construct similar vessels from cast materials such as cast iron or cast steel (more generally cast metals) problems were encountered not only because of the large quantities of materials which were required and their expense, but also because the fabrication time was realtively great and it was difficult, even with existing casting technology, to fabricate such vessels.

This is especially the case because nuclear-reactor installations with their primary coolant components are extremely large and the tendency toward the fabrication of still larger units is increasing. The fabrication of a single pressure vessel for such systems has thus become not only difficult but also uneconomical.

As a result, it has been proposed to substitute for this single housing for the integrated system, an arrangement in which the high-temperature reactor and the primary coolant components are contained in separate pressure vessels in a satellite construction wherein the component vessels are disposed around a central reactor vessel.

In this case, the pressure vessels for the primary coolant components are disposed in a partial circle around the reactor pressure vessel. Two horizontal gas conduits generally connect each of the component vessels with the high-temeprature reactor vessel for the delivery of the gas to the component vessel and return of the primary coolant to the reactor, respectively.

These gas conduits required a correspondingly large number of passages in the cylinder walls of the prestressed pressure vessels which detrimentally effected the strength of both the reactor vessel and the component vessel. Naturally, attempts were made to overcome this weakening of the reactor vessel by reinforcement, although this increases the cost and amount of material which must be used.

In the German patent publication (open application or Offenlegungsschrift) No. 23 26 917, there is described a nuclear-reactor installation in which the nuclear reactor is contained in a high-pressure vessel which is, in turn, surrounded by a cylindrical concrete containment or structure. Two heat exchangers are, in this system, connected with the reactor pressure vessel by coaxial ducts and are received, in turn, with respective burst-resisting containments reinforced by steel reinforcing cables or the like and composed of concrete. The containments are each applied to a concrete cylinder and the two concrete cylinders form part of the cylindrical concrete housing and are adapted to receive the drive motors for the primary coolant circulating pumps.

It is also known in this art to provide a reinforced concrete pressure vessel for nuclear reactors in which the desired or required volume is subdivided between two or more vessels each of which can be prestressed and all of which can be collectively surrounded by further prestressing cables into a unit.

In this construction, represented by the German Patent document (open application or Offenlegungsschrift) 16 84 594, the central vessel is larger than the peripheral vessels and serves to receive the nuclear reactor while four smaller vessels grouped around the central vessel receive the primary coolant components such as heat exchangers and coolant circulation components. The central vessel and the outer vessels are provided with horizontal passages so that the central vessel is connected with each of the outer vessels by two gas conduits.

In still another prior-art proposal, the pressure vessel for the high-temperature reactor is connected with the pressure vessels for the steam-generating components by burst-resisting connecting passages disposed beneath these pressure vessels. In this fashion the weakening of the cylindrical wall portions of the pressure vessels is avoided but the cost is increased since the passages must be sufficiently prestressed and strengthened in a redundant manner.

OBJECTS OF THE INVENTION

It is an object of the present invention to provide a nuclear reactor installation or assembly whereby the disadvantages of the aforedescribed systems are avoided.

Another object of the invention is to provide a pressure-vessel assembly, especially for a high-temperature nuclear reactor, in which weakening of the vessel walls is avoided but more direct gas passages can be provided that have been used at least in the last-mentioned prior-art solution.

It is also an object of the invention to provide a pressure-vessel assembly which affords a compact construction at relatively low cost and which does not require special prestressing or reinforcing of the gas passages.

SUMMARY OF THE INVENTION

These objects and others which will become apparent hereinafter are attained, in accordance with the present invention in which the pressure vessel assembly for the nuclear reactor installation comprises a cylindrical central vessel of cast metal and intrinsically prestressed, in addition to a plurality of peripheral, satellite or outer auxiliary pressure vessels which also may be axially and peripherally prestressed individually and likewise composed of cast material being generally of cylindrical configuration and annularly spaced about the central vessel over at least a partial circle.

According to the invention, each of the peripheral vessels is connected to the central vessel by a horizontal passage, the horizontal passages of all of the vessels lying in a common horizontal plane.

In accordance with an essential feature of the invention, the central vessel is provided with generally tangential and vertical planar surfaces in this horizontal plane while the pripheral of auxiliary vessels likewise have generally tangential and vertical surfaces. More particularly, at least one of the vertical surfaces of the central vessel lies perpendicular to the axis of each of the horizontal passages while at least one of the surfaces of each of the auxiliary vessels lies perpendicular to its horizontal passage and is flat against or flush with the corresponding horizontal surface of the passage of the central vessel communicating with its passage.

More particularly, the substantially cylindrical pressure vessels have in the region of the horizontal gas passages, which lie in a horizontal plane and run generally radially, an array of vertical planar surfaces. At least a portion of the planar surfaces of the reactor vessel are thus at right angles to the horizontal (radial) gas passages and each component vessel has a planar surface which lies directly against a corresponding planar surface of the central or reactor vessel. The component vessels are angularly spaced and the spaces between the individual component vessels, at least in the region of these vertical planar surfaces and the horizontal plane of the passages, is filled with support blocks until the assembly of component vessels and support blocks form a circle which completely surrounds the reactor vessel. The support blocks, in turn, have planar surfaces which directly abut, on the one hand, the planar surfaces of the reactor vessel between those planar surfaces against which the component vessels lie, and the lateral planar surfaces of the component vessels themselves. The support blocks and the component vessels thus form a composite disk which, in accordance with another essential feature of the invention, is prestressed inwardly by at least one peripheral prestressing strand surrounding this composite or compound disk. The inward prestress, therefore, applies the component vessels against the reactor vessel and, in addition, wedges the support blocks against the component vessels. The prestress is thus in the horizontal direction.

Each of the pressure vessels can, in accordance with a feature of the present invention, be prestressed in vertical and horizontal directions as well, i.e. by vertical prestressing cables extending along generatrices of the pressure vessel and received in the walls thereof. These vertical prestressing cables or bars can be used also to hold cover and base plates onto the cylindrical wall structures of the pressure vessels. The peripheral prestressing can be afforded by external cables or bands which are stressed inwardly while extending around the individual pressure vessels. The vertical and horizontal prestressing systems can be dimensioned to maintain the pressure forces on the walls of the vessel in equilibrium when the reactor system is in operation. In addition, when the pressure vessels are composed of cast iron or cast steel blocks, they can hold the joints between the blocks closed against any inward pressure which can normally develop in the reactor or auxiliary vessels.

In the region of the disk-shaped composite body, moreover, the horizontal prestressing arrangements of the individual vessels can be omitted since the horizontal prestress is provided by the common prestressing member or members which encircle the compound disk. In this case, the inner prestress afforded by this peripheral prestressing member or such prestressing members is such that the prestress balances the internal forces and sheer-resisting keys or the like need not be employed to prevent separation at the junctions of the various members.

The resulting structure has been found to be extremely compact and of exceptionally low cost since only in the region of the horizontal gas passages is it necessary to provide an inward prestressing member that surrounds all of the pressure vessels, i.e. the entire assembly. The use of the vertical prestressing members for the individual pressure vessels is uninhibited by this outer prestressing member or such outer prestressing members.

The system of the present invention has, by comparison with the integrated structures mentioned previously, a much shorter reaction time, thereby reducing the cost of setting up the assembly. The individual vessels are more readily accessible so that maintenance and repair of the components is possible with less difficulty. Naturally, individual satellite vessels can be replaced if necessary when relining or reinsulation is necessary, e.g. upon the failure of a liner or layer of insulation. The heat-exchanger components which can be introduced into the component vessels can be steam generators which can be connected to electric-current generating systems and it has been found to be advantageous to provide the blowers, pumps and motors for circulating the cooling gases above the heat exchangers in the component vessels.

One or more of the component vessels can be used for other purposes as may be required. For example, the waste-heat recovery system of the nuclear reactor can be installed in one or more component vessels. Such a system can include, in the conventional manner, a plurality of blowers with or without recuperative heat exchangers and a number of coolers. The component vessel or vessels for the waste-heat removal system can be interposed between other heat exchanger vessels, i.e those for steam generation and either the steam-generating vessels or the waste-heat recovery vessels can be provided with blowers with or without recuperators and coolers.

It has been found to be advantageous to provide at least one disk-shaped composite body. However, the construction can also be made in such a manner that two disk-shaped composite bodies are provided on above the other with the upper body lying just above the horizontal gas passages with the lower body lying just below them.

Advantageously the pressure vessels are composed of grey cast iron or cast steel while the support blo composed of grey cast iron and are made of hollow construction. This utilizes substantially less material.

In the plane of the passages, moreover, the reactor vessel can have the configuration of a polygon, i.e. all of the vertical surfaces may angularly adjoin other vertical surfaces all around the periphery of the vessel. The component pressure vessels, however, may be prismatic only in part, in the region in which they contact the support blocks or the central vessel, and may have a cylindrical curvature elsewhere, e.g. in the region in which they are contacted by the stressing element which passes around the composite disk.

The support blocks may be composed of hollow members with converging flanks which are wedged between converging flanks of successive component vessels. Two such blocks may be provided in each gap between a pair of component vessels.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
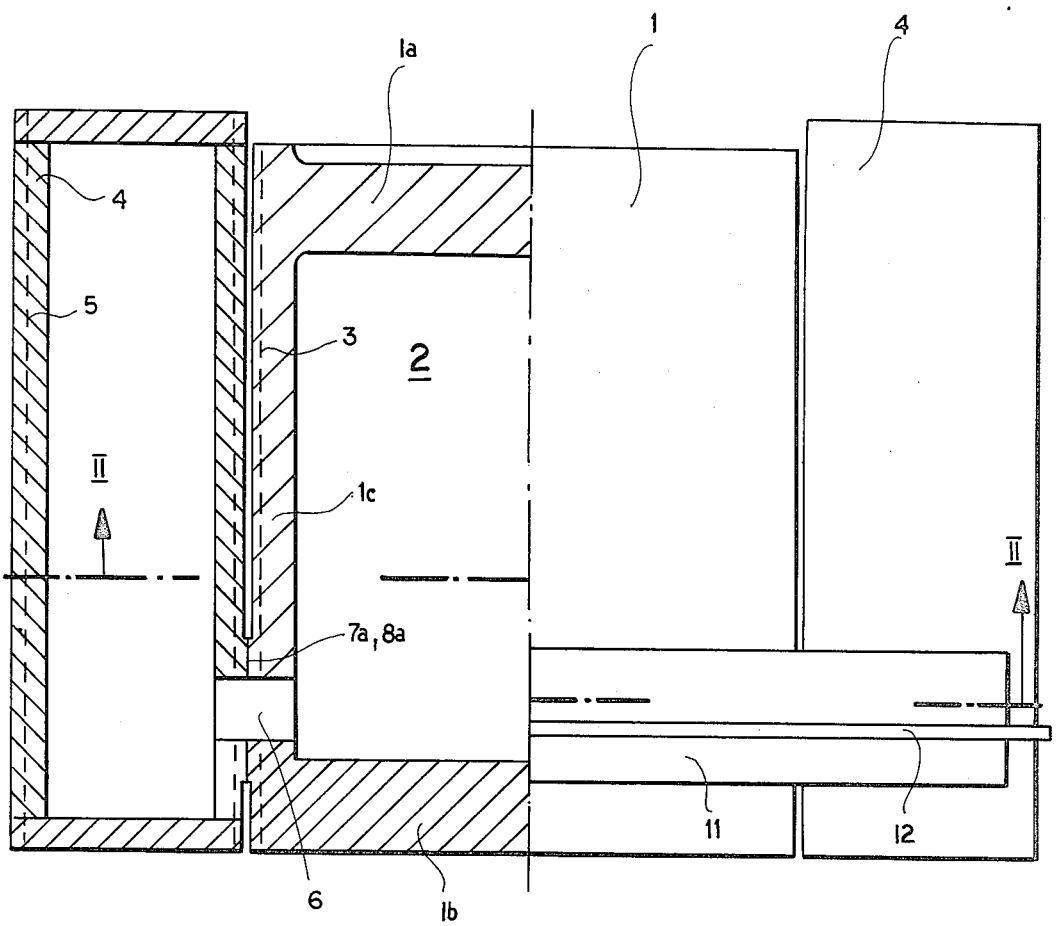
FIG. 1 is a view of a first embodiment of the present invention shown in section along the left side and in elevation at the right side, the system being illustrated diagrammatically.
Figure 2:
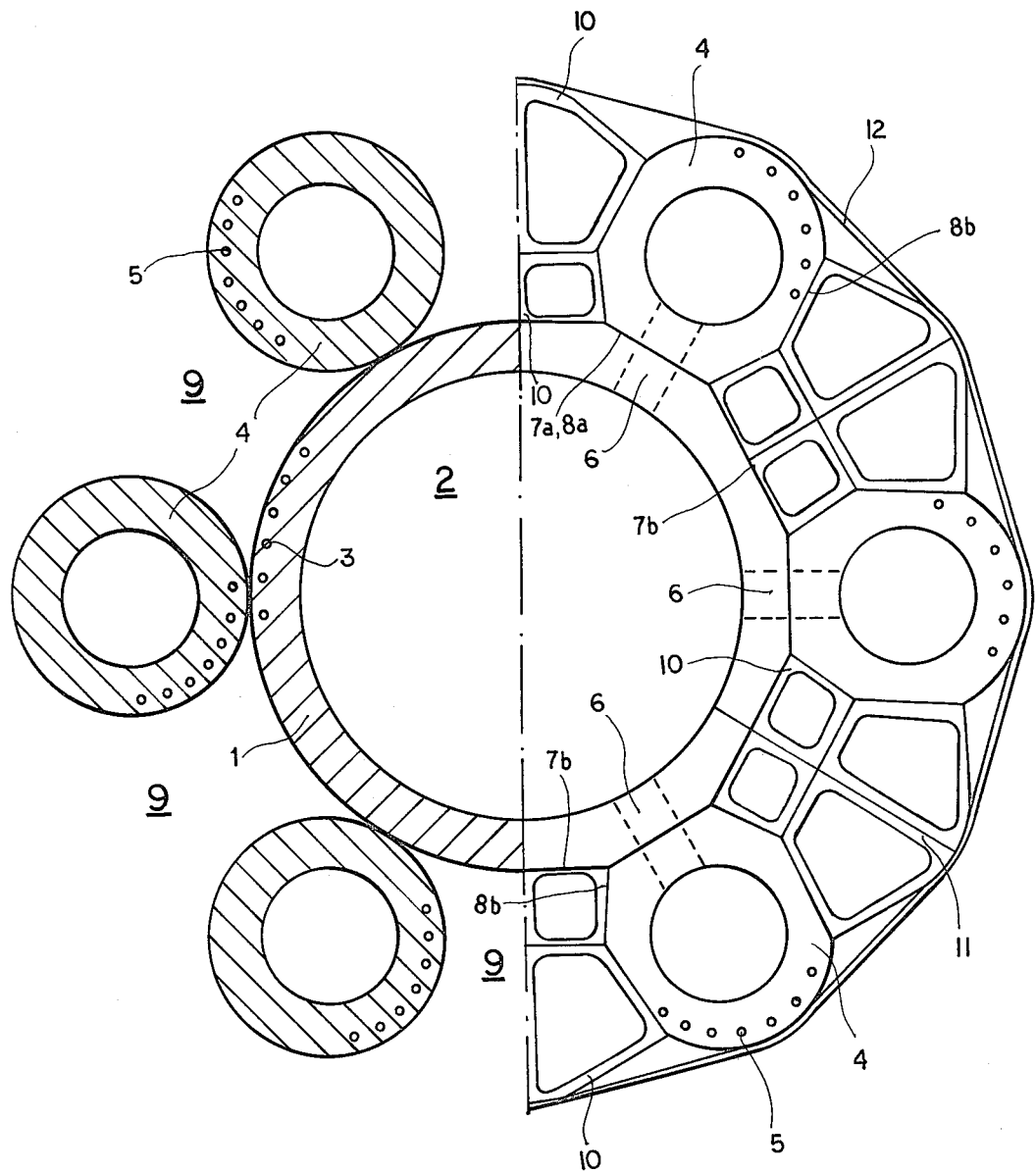
FIG. 2 is a cross-sectional view taken along the line 11—II of FIG. 1.

FIGS. 1 and 2 show a prestressed substantially cylindrical cast metal pressure vessel 1, hereinafter referred to as the reactor vessel, which has a central chamber 2 receiving a helium-cooled high-temperature nuclear reactor using ball-shaped nuclear fuel elements (not shown). Such reactors are conventional in the art.

The reactor vessel 1 has a copper plate 1a, a bottom plate 1b and a cylindrical wall structure 1c which is traversed by vertical stressing cables 3. The stressing means for the horizontal stressing of the individual receptacles is not shown in these Figures.

It should be understood that the pressure vessels of the present invention can be composed of cast iron or cast steel blocks which are assembled together while the cover 1a and the plate 1b may likewise be composed of segments or sectors held in interfitting and tight relationship. Such structures are known in the art.

Figure 1A:
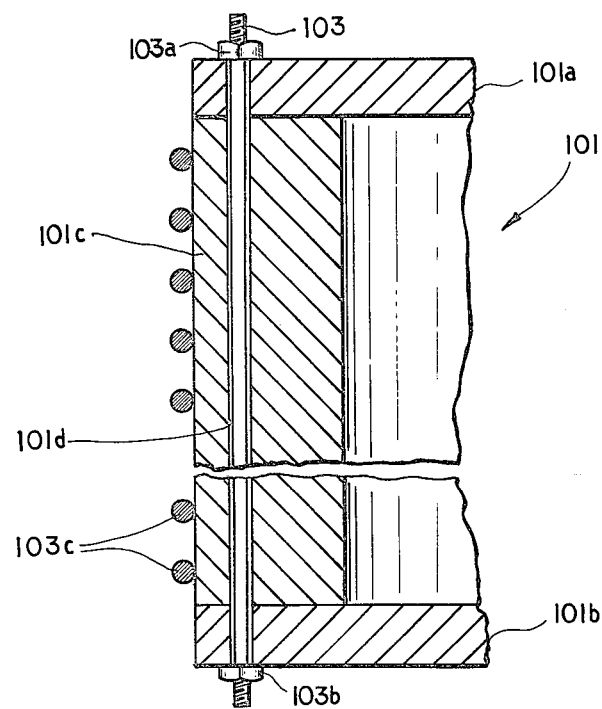
FIG. 1A is a detail cross-sectional view, also in diagrammatic form, showing the construction of a pressure vessel in accordance with the present invention and applicable both to the central or reactor vessel or to the satellite or component vessel.

Referring now to FIG. 1A, it will be seen that a typical pressure vessel, whether used as the central pressure vessel or one of the satellite vessels, as represented at 101 in FIG. 1A, can have a cover 101a which rests upon the wall structure 101c and is clamped by nuts 103a thereagainst, the nut being threaded onto the stressing cable 103. Corresponding nuts 103b engage the opposite end of the stressing cable 103. The cable 103 passes through a bore 101d in the wall structure 101c and through corresponding registering bores in the cover 101a and the base 101b. The prestressing cables 103c which extend around the vessel in horizontal planes provide the inward and individual prestress previously mentioned.

In a partial circle around the reactor vessel 1 there are provided a plurality of angularly equispaced component vessels 4 which are likewise formed from prestressed cast material as pressure vessels and which are likewise substantially cylindrical (see the foregoing discussion as to FIG. 1A).

Here the vertical prestressing is applied by tension cables 5 which pass through the cover and the bottom plates of the component vessel 4. Horizontal prestress is effected via cables 103c in the manner already described and as shown, for example, in FIG. 1B.

Each component vessel 4 communicates with the reactor vessel 1 via a horizontal gas passage 6 which can be provided with a pair of coaxial conduits one of which delivers gas to the component vessel while the other conducts the gas back into the reactor vessel. Preferably, the hot gas from the high-temperature reactor traverses the inner of the coaxial conduits while the returning gas, relatively cool, traverses the outer conduit of the coaxial conduit system.

All of the horizontal gas passages 6 lie in a common horizontal plane and extend radially with respect to the vertical axis of the assembly.

The horizontal plane of the passages 6 lies in the lower portion of the cylindrical wall 1c of the reactor vessel 1.

In the region of the horizontal gas passages 6, the reactor vessel 1 is provided with a plurality of vertical planar surfaces 7 which together form a polygonal cross section for the reactor vessel and lie generally along tangents to circles centered on the axis of the reactor vessel. Thus in the region of the plane mentioned previously, the reactor vessel has a polygonal cross section. The vertical planar surfaces 7 are so arranged that some of the surfaces 7a lie at right angles and are pierced by the horizontal radial gas passages 6.

The component vessels 4 in the same region are also provided with vertical planar surfaces, i.e. at least three and preferably five such surfaces angularly adjoining one another. One of the planar surfaces of each of these component vessels, shown at 8a, lies directly against the corresponding surface 7a and is coextensive therewith, being also perpendicular to the gas passage 6 which communicates between this component vessel and the reactor vessel 1.

The gaps 9 between the individual component vessels 4 are filled only in the region of the vertical planar surfaces 7 and 8 into a complete circular disk with support blocks 10 of grey cast iron. The support blocks 10 are as shown hollow and hence constituted by cast webs.

The support blocks 10 abut the vertical planar surfaces 7b of the reactor vessel 1 between the surfaces 7a and against the lateral planar surfaces 8b of the component vessels 9. As a result, in the region of the horizontal plane mentioned previously, the pressure vessels 1 and 4 form together with the support blocks 10 a disk-shaped compound body 11.

Figure 1B:
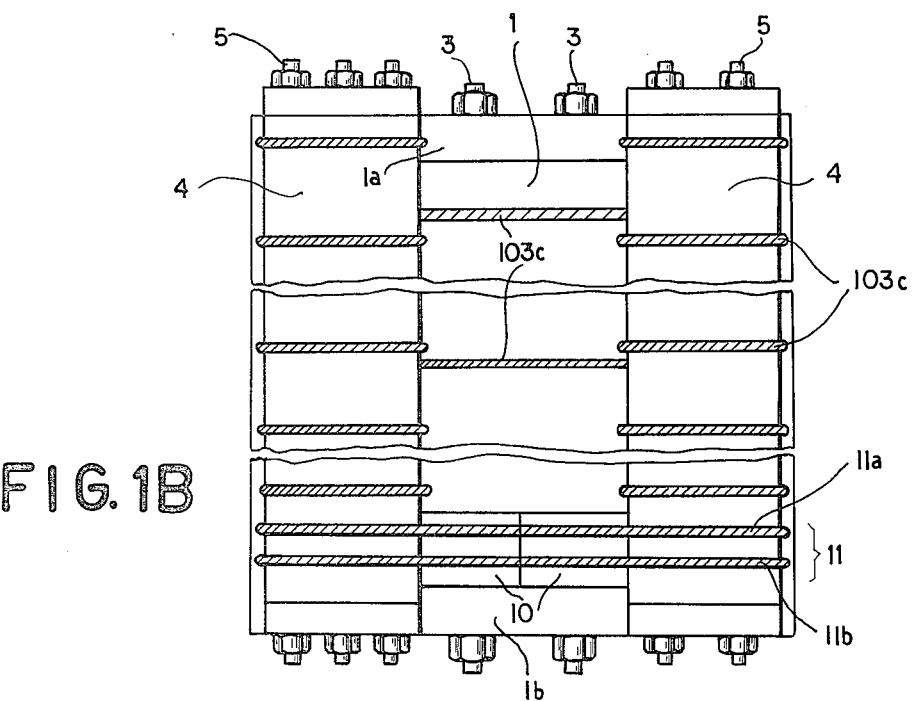
FIG. 1B is an elevational view also in diagrammatic form, of a portion of the reactor system.

A horizontal prestressing member 12 as shown generally in FIG. 1 and FIG. 2 in which it is constituted as a band but as cables 11a and 11b in FIG. 1B, prestresses the composite disk inwardly. The manner in which the peripheral prestressing member 11a, 11b or 12 passes around the disk can be seen from FIG. 2. The vertical prestressing of the individual vessels by means of the tension cables 3 and 5 or 103 is thus not effected in any way by the support blocks 10.

The component vessels 4 preferably receive the steam-generating heat exchangers and any waste-heat recovery system in the manner described.

Figure 3:
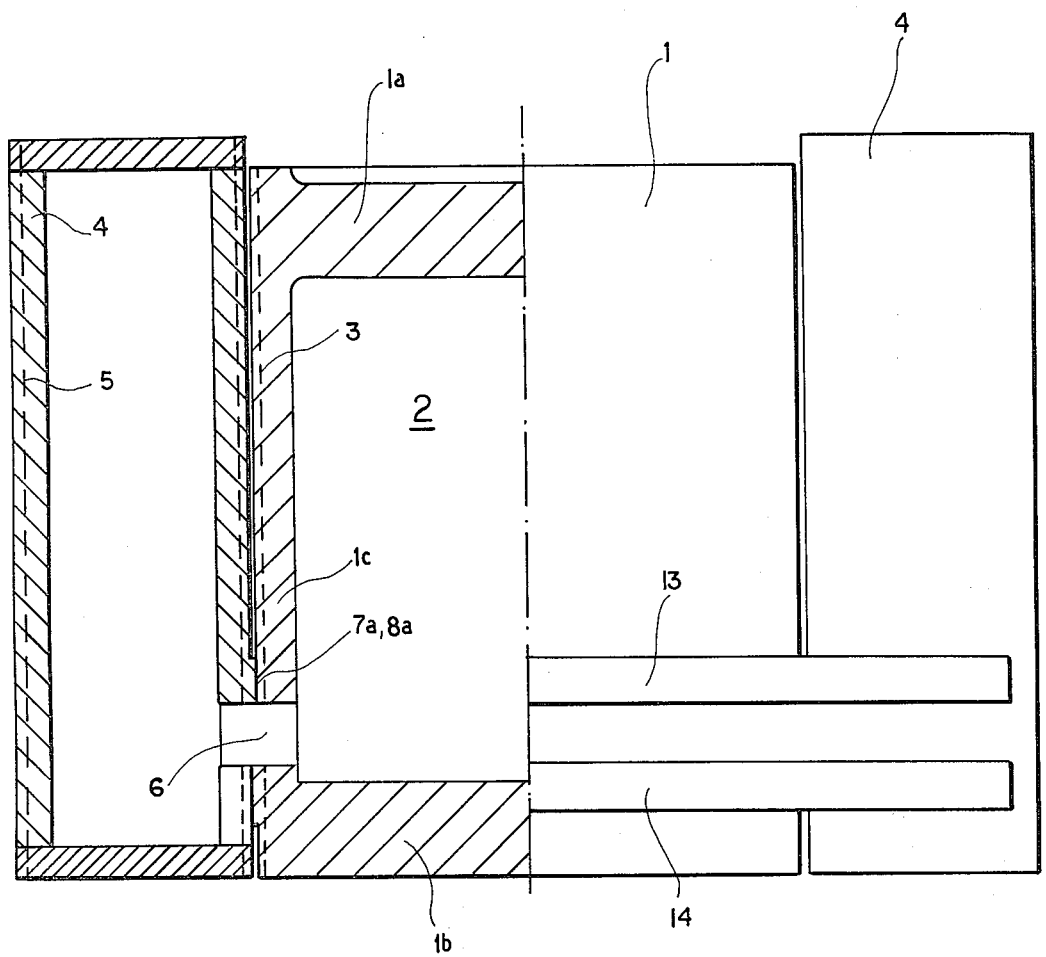
FIG. 3 is a view similar to FIG. 1 but illustrating a second embodiment of the invention with the left side being shown in longitudinal cross section and the right side in elevation.

FIG. 3 shows an embodiment of the invention in which the hollow support blocks 10 do not form a single composite body but rather form two composite bodies represented at 13 and 14 respectively above and below the gas passage 6. Each of the composite bodies 13 and 14 can be stressed inwardly by a respective band 12 or set of cables 11a, 11b.

I claim:

1. In a pressure-vessel assembly for a nuclear-reactor installation wherein a central pressure vessel of cast material and of generally cylindrical configuration is adapted to receive a high-temperature nuclear reactor, and a plurality of component vessels of cast material surround the central vessel and communicate by respective gas passages therewith, the component vessels receiving heat exchangers for at least a primary coolant for the nuclear reactor, the improvement wherein:

the central vessel communicates with each of the component vessels via a respective one of said passages with the passages lying in a common horizontal plane and extending radially of the central vessel;

said central vessel is provided with a multiplicity of generally vertical planar surfaces in said horizontal plane, respective ones of said surfaces lying at right angles to the respective passages;

said component vessels are provided with planar surfaces in the region of said passages with one planar surface lying flat against a corresponding surface of said central vessel perpendicular to the passage communicating between the respective component vessel and the central vessel;

respective support blocks of a height substantially equal to that of said planar surfaces are received between pairs of said component vessels and have planar surfaces lying against the planar surfaces of said central vessel between said component vessels and of said component vessels; and at least one inward prestressing member extends peripherally around the assembly and bears inwardly upon said support blocks and said component vessels, said support blocks, said central vessel and said component vessels forming a compound-disk structure in the region in which said component vessels and support blocks are engaged by said member.

2. The improvement defined in claim 1 wherein two such disk structures are formed above and below the horizontal passages each with a respective peripheral inwardly stressing member.

3. The improvement defined in claim 1 wherein said support blocks are composed of grey cast iron.

4. The improvement defined in claim 3 wherein said support blocks are hollow.

5. The improvement defined in claim 1 wherein a pair of such support blocks are disposed between each pair of component vessels, each pair of support blocks having inwardly converging flanks bearing upon inwardly converging flanks of the pair of component vessels.

6. The improvement defined in claim 5 wherein each of said pressure vessels is provided with longitudinal prestressing cables spaced around the wall of the respective pressure vessel.

7. The improvement defined in claim 6, further comprising horizontal prestressing members surrounding each of said pressure vessels.

8. The improvement defined in claim 7 wherein said component vessels bear upon said central vessel only in the region of the planar surfaces.

* * * * *